(12) United States Patent
Hirabayashi et al.

(10) Patent No.: US 7,609,296 B2
(45) Date of Patent: Oct. 27, 2009

(54) RECORDING APPARATUS, RECORDING METHOD, AND RECORDING MEDIUM USING AN INDEX FILE

(75) Inventors: Mitsuhiro Hirabayashi, Tokyo (JP); Kenichiro Aridome, Kanagawa (JP); Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 993 days.

(21) Appl. No.: 10/398,618

(22) PCT Filed: Jul. 26, 2002

(86) PCT No.: PCT/JP02/07621

§ 371 (c)(1),
(2), (4) Date: Sep. 8, 2003

(87) PCT Pub. No.: WO03/015098

PCT Pub. Date: Feb. 20, 2003

(65) Prior Publication Data

US 2005/0226603 A1    Oct. 13, 2005

(30) Foreign Application Priority Data

Aug. 8, 2001    (JP) .............................. 2001-240243

(51) Int. Cl.
*H04N 5/228* (2006.01)
(52) U.S. Cl. ..................... 348/222.1; 386/95
(58) Field of Classification Search ... 348/222.1–231.9, 348/232; 386/95; 707/5, 100, 102; 235/380; 715/203; 382/251, 309, 306; 358/1.15; 380/28
See application file for complete search history.

(56) References Cited

U.S. PATENT DOCUMENTS

| 4,864,497 | A | * | 9/1989 | Lowry et al. ................. 707/102 |
| 5,706,496 | A | * | 1/1998 | Noguchi et al. ................ 707/3 |
| 5,740,355 | A | * | 4/1998 | Watanabe et al. ............. 714/45 |
| 5,751,280 | A | * | 5/1998 | Abbott et al. ................ 715/203 |
| 5,751,281 | A |   | 5/1998 | Hoddie et al. |
| 5,835,597 | A | * | 11/1998 | Coppersmith et al. ......... 380/28 |
| 5,898,709 | A | * | 4/1999 | Imade et al. ................. 714/763 |
| 5,920,705 | A | * | 7/1999 | Lyon et al. ................... 709/240 |
| 5,992,737 | A | * | 11/1999 | Kubota ........................ 235/380 |
| 6,018,744 | A | * | 1/2000 | Mamiya et al. ........... 707/104.1 |
| 6,041,323 | A | * | 3/2000 | Kubota ........................... 707/5 |

(Continued)

FOREIGN PATENT DOCUMENTS

EP    0 424 903    8/1997

(Continued)

*Primary Examiner*—Tuan V Ho
*Assistant Examiner*—Kent Wang
(74) *Attorney, Agent, or Firm*—Frommer Lawrence & Haug LLP; William S. Frommer; Thomas F. Presson

(57) ABSTRACT

A recording system that includes a creating unit for creating an index file including a plurality of areas to each of which a unique identifier is assigned, and a recording unit for recording the index file on the recording medium. The creating unit divides file attribute information into first attribute information of a fixed data length and second attribute information of a variable data length, stores separately a plurality pieces of first attribute information associated with a plurality of files, respectively, and a plurality pieces of second attribute information associated with the plurality of first attribute information.

10 Claims, 12 Drawing Sheets

U.S. PATENT DOCUMENTS

| | | | |
|---|---|---|---|
| 6,112,010 A * | 8/2000 | Koyama et al. | 386/95 |
| 6,201,902 B1 * | 3/2001 | Sasaki et al. | 382/309 |
| 6,301,614 B1 * | 10/2001 | Najork et al. | 709/223 |
| 6,366,698 B1 * | 4/2002 | Yamakita | 382/187 |
| 6,463,439 B1 * | 10/2002 | Dahlberg | 707/100 |
| 6,826,555 B2 * | 11/2004 | Nunez | 707/2 |
| 7,072,521 B1 * | 7/2006 | Cadwell | 382/251 |
| 7,509,329 B1 * | 3/2009 | Leverett et al. | 707/101 |
| 2002/0003576 A1 * | 1/2002 | Konishi et al. | 348/232 |
| 2002/0006266 A1 * | 1/2002 | Yoon et al. | 386/69 |
| 2003/0160995 A1 * | 8/2003 | Oka et al. | 358/1.15 |
| 2007/0239708 A1 * | 10/2007 | Nakamura et al. | 707/5 |

FOREIGN PATENT DOCUMENTS

| | | |
|---|---|---|
| EP | 0 801 391 | 10/1997 |
| EP | 1 085 515 | 3/2001 |
| JP | 8 44856 | 2/1996 |
| JP | 8 63485 | 3/1996 |
| JP | 8 163507 | 6/1996 |
| JP | 9 213056 | 8/1997 |
| JP | 9 247597 | 9/1997 |
| JP | 2712656 | 10/1997 |
| JP | 10-40666 | 2/1998 |
| JP | 10 55657 | 2/1998 |
| JP | 10 341402 | 12/1998 |
| JP | 2940872 | 6/1999 |
| JP | 2000-113644 | 4/2000 |
| JP | 2001 84705 | 3/2001 |
| JP | 2002-170361 | 6/2002 |
| WO | WO 00 73911 | 12/2000 |

* cited by examiner

FIG.6

| START BYTE POSITION | DATA LENGTH | FIELD NAME |
|---|---|---|
| 0 | L_PR1 | AV FILE BASIC PROPERTY #0 |
| L_PR1 | L_PR2 | AV FILE BASIC PROPERTY #1 |
| L_PR1+L_PR2 | L_PR3 | AV FILE BASIC PROPERTY #2 |
| ⋮ | ⋮ | ⋮ |
| L_PR1+⋯+L_PRn−1 | L_PRn | AV FILE BASIC PROPERTY #n |

FIG.7A

| START BYTE POSITION | DATA LENGTH (BYTE) | FIELD NAME |
|---|---|---|
| 0 | 4 | ENTRY NUMBER |
| 4 | 1 | ENTRY PROPERTY |
| 5 | 4 | FOLDER PROPERTY |
| 9 | 1 | VERSION |
| 10 | 2 | FLAG |
| 12 | 1 | DATA TYPE |
| 13 | 4 | CREATION DATE/TIME |
| 17 | 4 | MODIFICATION DATE/TIME |
| 21 | 4 | DURATION |

FIG.7B

| START BYTE POSITION | DATA LENGTH (BYTE) | FIELD NAME |
|---|---|---|
| 0 | VARIABLE LENGTH | FILE IDENTIFIER |

FIG.8A
| ENTRY NUMBER | | 0 | 1 | 2 | 3 | 4 | 5 | 6 | 7 |
|---|---|---|---|---|---|---|---|---|---|
| ENTRY PROPERTY | 0TH BIT | 0 | 1 | 1 | 0 | 0 | 1 | 1 | 1 |
| | FIRST BIT | 0 | 0 | 1 | 0 | 0 | 0 | 1 | 0 |
| FOLDER PROPERTY | | T | 0 | 0 | 0 | 3 | 3 | 4 | 4 |
FIG.8B
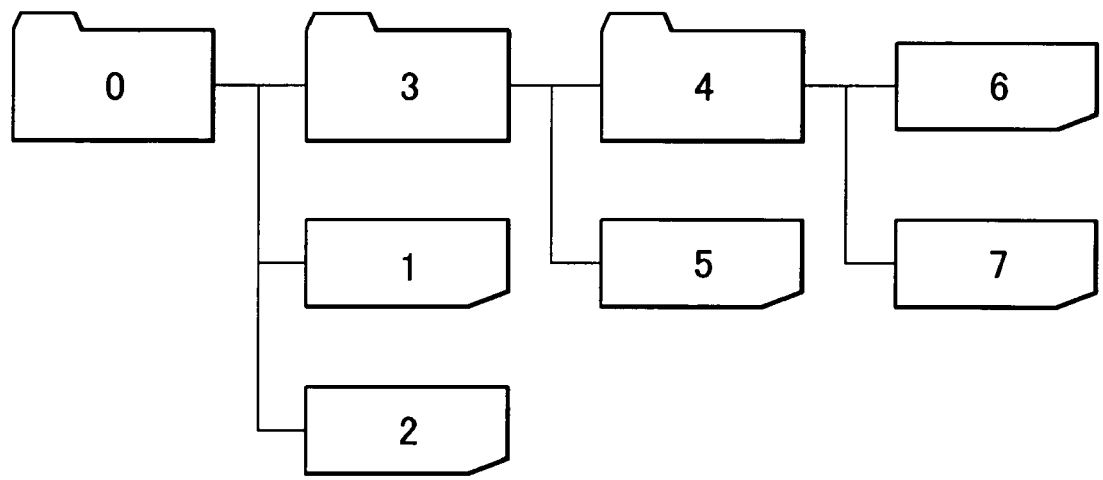
 ;FOLDER
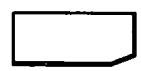 ;DATA

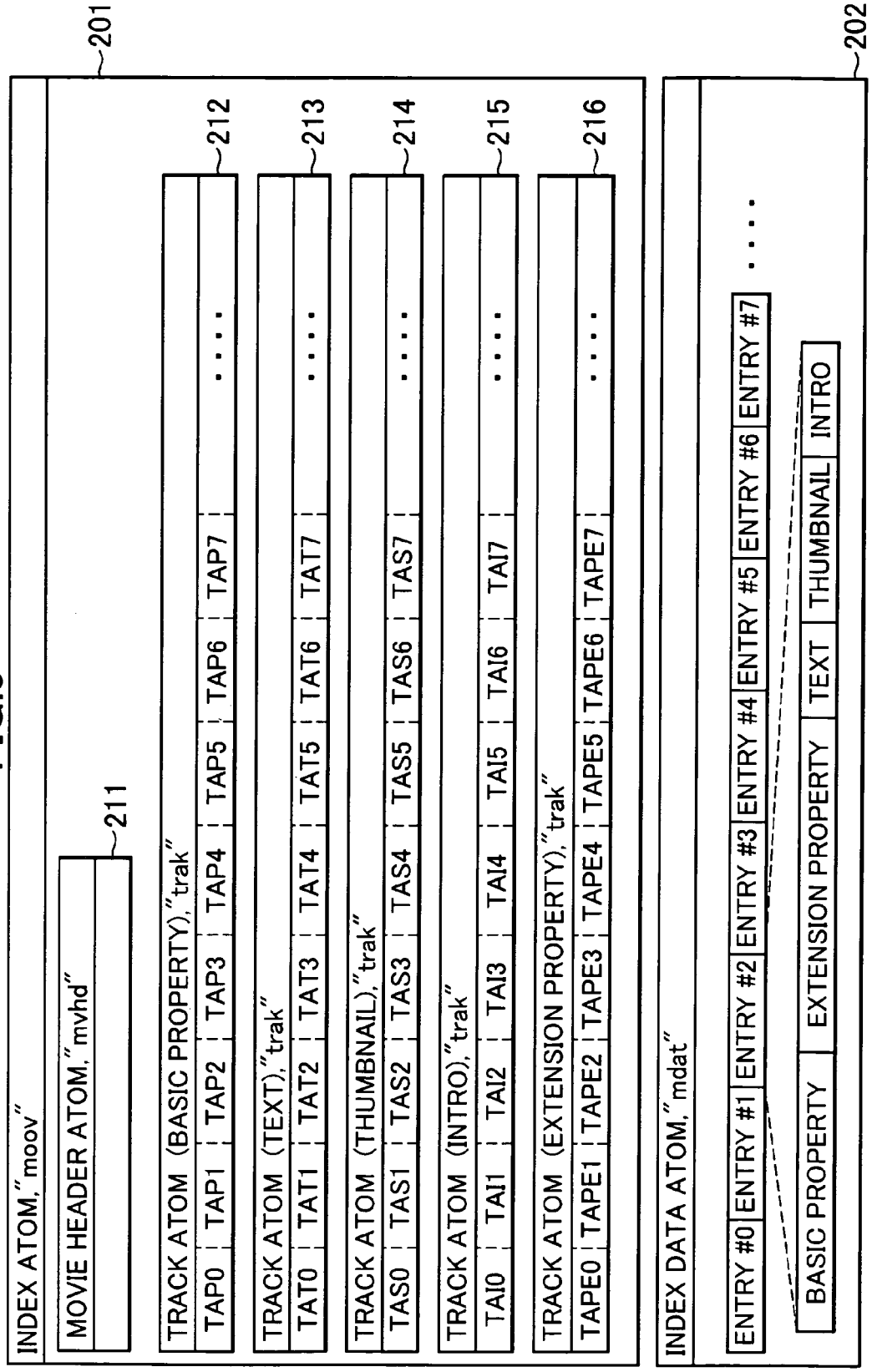

FIG.11A

| START BYTE POSITION | DATA LENGTH (BYTE) | FIELD NAME |
|---|---|---|
| 0 | 4 | ENTRY NUMBER |
| 4 | 1 | ENTRY PROPERTY |
| 5 | 4 | FOLDER PROPERTY |
| 9 | 1 | VERSION |
| 10 | 2 | FLAG |
| 12 | 1 | DATA TYPE |
| 13 | 4 | CREATION DATE/TIME |
| 17 | 4 | MODIFICATION DATE/TIME |
| 21 | 4 | DURATION |

FIG.11B

| START BYTE POSITION | DATA LENGTH (BYTE) | FIELD NAME |
|---|---|---|
| 0 | 4 | ENTRY NUMBER |
| 4 | 1 | ENTRY PROPERTY |
| 5 | 4 | FOLDER PROPERTY |
| 9 | VARIABLE LENGTH | FILE IDENTIFIER |

FIG.12A
| ENTRY NUMBER | | 0 | 1 | 2 | 3 | 4 | 5 | 6 | 7 | 8 | 9 |
|---|---|---|---|---|---|---|---|---|---|---|---|
| ENTRY PROPERTY | 0TH BIT | 0 | 1 | 1 | 0 | 0 | 1 | 1 | 1 | 1 | 1 |
| | SECOND BIT | 0 | 0 | 0 | 0 | 0 | 0 | 0 | 0 | 1 | 1 |
| FOLDER PROPERTY | | T | 0 | 0 | 0 | 3 | 3 | 4 | 4 | 2 | 6 |
FIG.12B
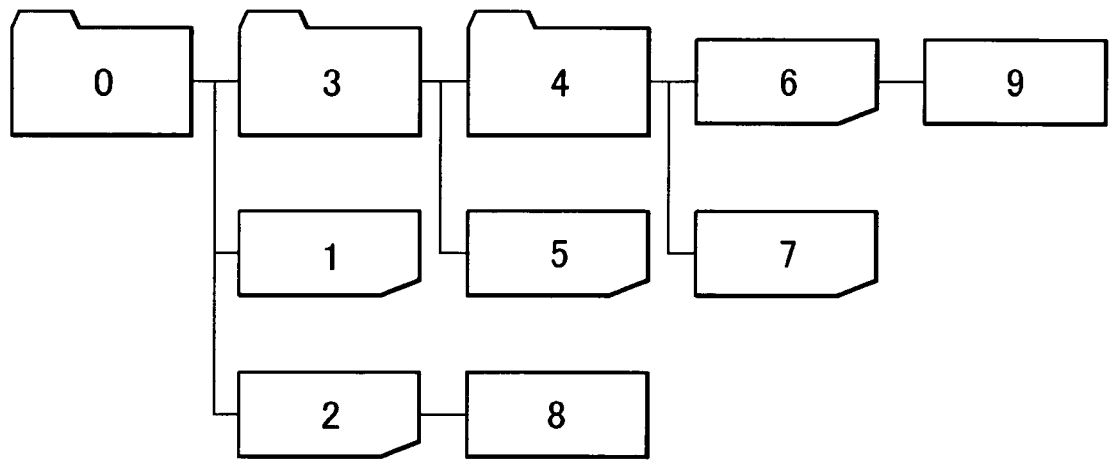
 ;FOLDER
 ;DATA
 ;DATA OF EXTENSION PROPERTY

RECORDING APPARATUS, RECORDING METHOD, AND RECORDING MEDIUM USING AN INDEX FILE

TECHNICAL FIELD

The present invention relates to a recording apparatus for recording video data, audio data or the like on a recording medium, and more particularly, to a recording apparatus which records on the recording medium an index file created for holding index information of files recorded on the recording medium separately as a portion with a data length of a fixed length and a portion with a data length of a variable length, and also relates to a recording method for use in such a recording apparatus and a recording medium for recording the index file, and further relates to an electronic camera provided with such a recording apparatus.

BACKGROUND ART

Conventionally, in a recording apparatus for recording video data, audio data or the like, for example a camcorder, a plurality of data of recorded several scenes are recorded in respective files on a disk-shape recording medium such as a magneto-optical disk or an optical disk. A known recording/reproducing apparatus has both functions of reproducing and editing recorded data by providing such a recording apparatus with a display section, for example a liquid crystal display panel and an organic electroluminescence display panel, and a sound generating section such as a speaker.

A user (user) who uses such a recording apparatus or a recording/reproducing apparatus often records scenes of different recording dates, scenes of different travel spots, scenes of different events and the like on a single recording medium when the recording medium has a large capacity.

In such a recording medium which has a plurality of scenes recorded thereon in respective files, the user can select desired data to be reproduced or edited by specifying a file.

Typically, a desired file is generally specified, for example by entering the name of the file. When a plurality of files, particularly a number of files are recorded on the recording medium, it is difficult for the user to remember all the file names in desired files.

Thus, it is contemplated that it is convenient to provide an index file (index file) in which information (index information) for identifying the contents of the plurality of files recorded on the recording medium are organized. In the index file, the index information of the plurality of files are sequentially stored corresponding to the plurality of files. It is contemplated that the recording/reproducing apparatus displays respective index information corresponding to the plurality of files on the display section in accordance with this index file and the user refers to this to specify a desired file.

When the plurality of files can be retrieved with such an index file, the user may perform edits to replace a file with another file or to rewrite only the file name of a specific file. In such a case, the data amount of the index information in the file subjected to the edits after the edits may be different from that before the edits, and the storing position of each index information in the index file before the edits may be different from that after the edits. Thus, a change in the index file may not be supported by rewriting new index information only in the position where the index information corresponding to the edited file is stored. Therefore, the whole index file must be rewritten, or the portion after the position where the index information corresponding to the edited file is stored must be written.

However, when a number of files are managed by the index file, the data amount of the index file is large and thus a problem occurs that it takes a long time for writing the index file on the recording medium. In addition, since writing requires a long time depending on the material of the recording medium or the recording method, a problem occurs that it takes a long time for writing the index file.

Thus, it is an embodiment of the present invention to provide a recording method and a recording apparatus capable of performing rewriting of an index file at high speed when the index file is rewritten by dividing index information into a fixed data length section and a variable data length section.

It is another embodiment of the present invention to provide a recording medium which has such a fast rewritable index file recorded thereon and an electronic camera provided with such a recording apparatus.

DISCLOSURE OF THE INVENTION

The present invention provides a recording apparatus comprising creating means for creating an index file including a plurality of areas to each of which a unique identifier is assigned and recording means for recording the index file on a recording medium, wherein the creating means divides attribute information indicating an attribute of a file into first attribute information which is a collection of only fields with a data length of a fixed length and second attribute information including a field with a data length of a variable length, holds separately a plurality pieces of first attribute information associated with a plurality of files recorded on the recording medium, respectively, and a plurality pieces of second attribute information associated with the plurality pieces of first attribute information, respectively, in the plurality of areas while the plurality pieces of first attribute information are associated with the plurality of files, respectively, and the plurality pieces of second attribute information are associated with the plurality pieces of first attribute information, respectively, and collects an area of the plurality of areas with a data length of a fixed length as a first area group, and collects an area of the plurality of areas with a data length of a variable length as a second area group, and holds them in the index file.

In one embodiment of the present invention, in the above-mentioned recording apparatus, the index file comprises a first portion holding the first area group and the second area group, and a second portion holding information indicating respective positions of the plurality of areas in the first portion, and the first attribute information is associated with the second attribute information by having identification information indicating whether or not the second attribute information is attached to the first attribute information included as a field in the first attribute information.

In addition, in the present invention, in the above-mentioned recording apparatus, the second attribute information includes identification information indicating that itself is attribute information attached to the first attribute information in a field, and the first attribute information is associated with the second attribute information by having identification information indicating the first attribute information to which the second attribute information is attached included in the second attribute information.

A recording method according to an embodiment of the present invention comprises dividing attribute information indicating an attribute of a file into first attribute information which is a collection of only fields with a data length of a fixed length and second attribute information including a field with a data length of a variable length, holding separately a plurality pieces of first attribute information associated with a plurality of files recorded on a recording medium, respectively, and a plurality pieces of second attribute information associated with the plurality pieces of first attribute information, respectively, in a plurality of areas to each of which a unique identifier is assigned while the plurality pieces of first attribute information are associated with the plurality of files, respectively, and the plurality pieces of second attribute information are associated with the plurality pieces of first attribute information, respectively, collecting an area of the plurality of areas with a data length of a fixed length as a first area group, collecting an area of the plurality of areas with a data length of a variable length as a second area group, and creating an index file to hold them, and recording the created index file on the recording medium.

In addition, a recording medium according to the present invention records an index file created by dividing attribute information indicating an attribute of a file into first attribute information which is a collection of only fields with a data length of a fixed length and second attribute information including a field with a data length of a variable length, holding separately a plurality pieces of first attribute information associated with a plurality of recorded files, respectively, and a plurality pieces of second attribute information associated with the plurality pieces of first attribute information, respectively, in a plurality of areas to each of which a unique identifier is assigned while the plurality pieces of first attribute information are associated with the plurality of files, respectively, and the plurality pieces of second attribute information are associated with the plurality pieces of first attribute information, respectively, collecting an area of the plurality of areas with a data length of a fixed length as a first area group, collecting an area of the plurality of areas with a data length of a variable length as a second area group, and creating the index file to hold them.

Also, the present invention provides an electronic camera comprising creating means for creating an-index file including a plurality of areas to each of which a unique identifier is assigned, and recording means for recording a picture signal obtained by taking a picture of a subject as a file on a recording medium and recording the index file on the recording medium, wherein the creating means divides attribute information indicating an attribute of a file into first attribute information which is a collection of only fields with a data length of a fixed length and second attribute information including a field with a data length of a variable length, holds separately a plurality pieces of first attribute information associated with a plurality of files recorded on the recording medium, respectively, and a plurality pieces of second attribute information associated with the plurality pieces of first attribute information, respectively, in the plurality of areas while the plurality pieces of first attribute information are associated with the plurality of files, respectively, and the plurality pieces of second attribute information are associated with the plurality pieces of first attribute information, respectively, and collects an area of the plurality of areas with a data length of a fixed length as a first area group, and collects an area of the plurality of areas with a data length of a variable length as a second area group, and holds them in the index file.

In the recording apparatus, the recording method, the recording medium, and the electronic camera as described above, the attribute information associated with the plurality of recorded files are held in the index file separately as the portion with a data length of a fixed length and the portion with a variable length. Thus, even when the data length of the whole attribute information is varied due to edits or the like, the varied portion is created only in the variable portion, so that the variable portion may be again recorded on the recording medium.

Therefore, the re-recording can be performed faster than the case where the whole index file is re-recorded on the recording medium.

BRIEF DESCRIPTION OF THE DRAWINGS

FIG. 6 is a diagram showing an example of a track atom (property);

FIG. 7A and FIG. 7B are diagrams showing exemplary real data of the property in the first embodiment;

FIG. 8A to FIG. 8B are diagrams showing examples of the property information and the structure of index data in the first embodiment;

FIG. 9 is a diagram showing another exemplary index file in the first embodiment created by using the QuickTime movie file;

FIG. 11A to FIG. 11B are diagrams showing exemplary real data of the property in the second embodiment; and FIG. 12A to FIG. 12B are diagrams showing examples of the property information and the structure of the index data in the second embodiment.

BEST MODE FOR CARRYING OUT THE INVENTION

Figure 1:
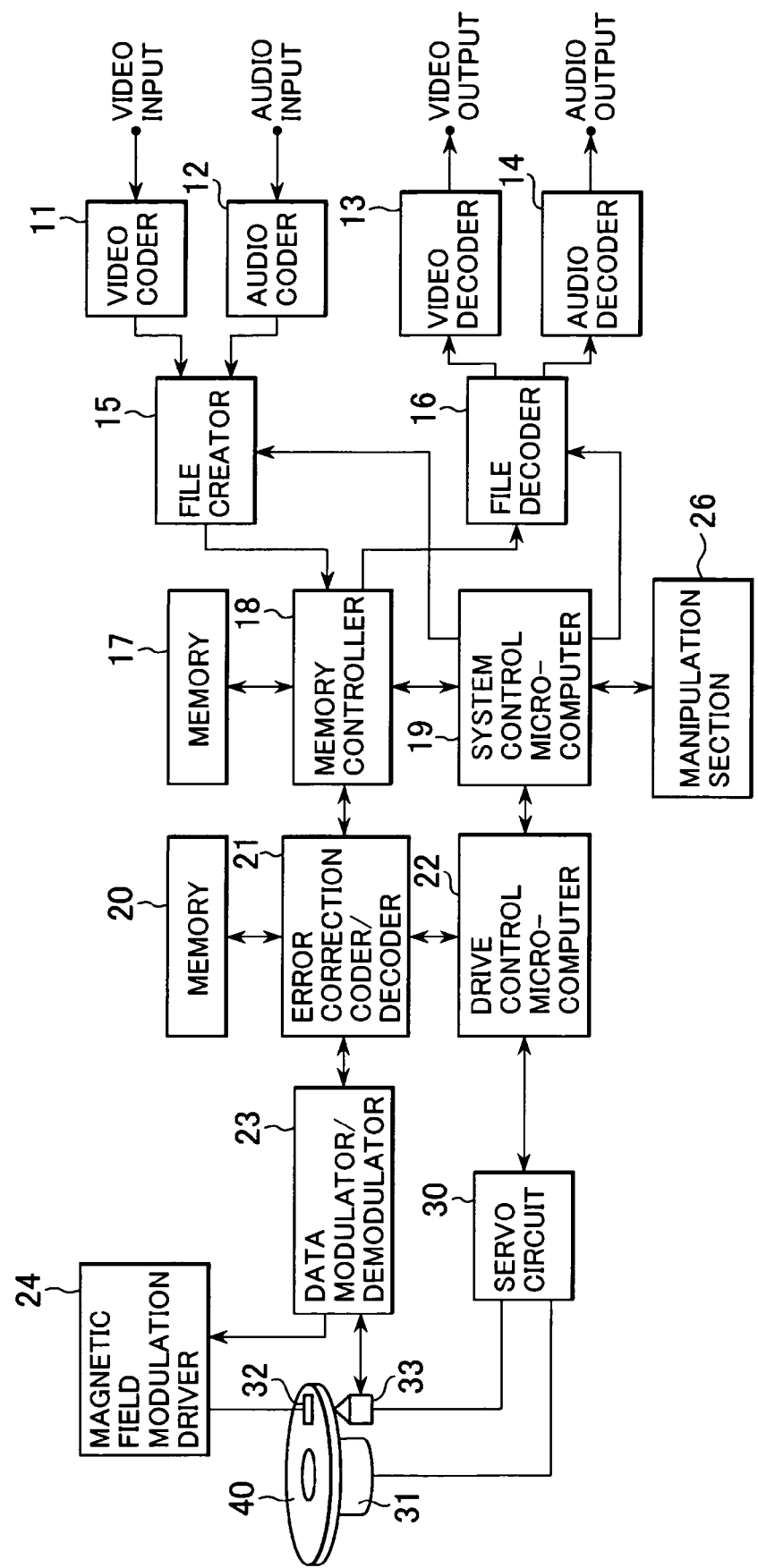
FIG. 1 is a block diagram showing an exemplary configuration of a digital recording/reproducing apparatus.

Embodiments of the present invention are hereinafter described on the basis of the drawings. It should be noted that the same components are designated with the same reference numerals in the respective figures.

First Embodiment

FIG. 1 is a block diagram showing an exemplary configuration of a digital recording/reproducing apparatus.

In FIG. 1, the digital recording/reproducing apparatus is configured to comprise a video coder 11, an audio coder 12, a video decoder 13, an audio decoder 14, a file creator 15, a file decoder 16, memories 17, 20, a memory controller 18, a system control microcomputer 19, an error correction coder/decoder 21, a drive control microcomputer 22, a data modulator/demodulator 23, a magnetic field modulation driver 24, a manipulation section 26, a servo circuit 30, a motor 31, a magnetic field head 32, and an optical pickup 33.

A video signal is supplied from a video input terminal to the video coder 11 for compression and coding. An audio signal is supplied from an audio input terminal to the audio coder 12 for compression and coding. Respective outputs from the video coder 11 and the audio coder 12 are called elementary streams.

In the present embodiment, the digital recording/reproducing apparatus is provided in a camera-integral type digital recording/reproducing apparatus. As the video signal, a picture taken by a video camera is supplied. The video camera creates the video signal from image light of a subject supplied by an optical system to an image pickup device such as a CCD (Charge Coupled Device). As the audio signal, sounds collected by a microphone are supplied.

The video coder 11 is configured to comprise respective electronic circuits of an analog/digital converter (hereinafter abbreviated as "A/D"), a format conversion section, a picture sorting section, a subtracter, a DCT section, a quantization section, a variable length coding section, a buffer memory, a rate control section, a dequantization section, an inverse DCT section, an adding section, a frame memory, a motion compensation prediction section, and a switch, when compression and coding is of MPEG, for example.

The video signal supplied to the video coder 11 is digitized by the A/D and then converted to a spatial resolution used in coding by the format conversion section, and output to the picture sorting section. The picture sorting section rearranges pictures in the order suitable for coding, specifically, in the order suitable for first coding I pictures and P pictures and then coding B pictures.

The output from the screen sorting section is input to the DCT section through the subtracting section, and DCT coding is performed. The output from the DCT section is input to the quantization section for quantization in predetermined bit numbers. The output from the quantization section is input to the variable coding section and the dequantization section. The variable length coding section performs coding with a variable code such that a shorter code is assigned to data of a higher frequency of occurrence, for example, the Huffman code, and the coded data is output to the buffer memory of the memory. The buffer memory outputs the coded data as the output from the video coder at a predetermined rate. Also, the rate control section controls the quantization operation of the quantization section to maintain a predetermined bit rate by monitoring the buffer memory since the code amount created at the variable coding section is variable.

On the other hand, since I pictures and P pictures are used as reference screens by the motion compensation prediction section, the signal input from the quantization section to the dequantization section is dequantized and then input to the inverse DCT section to perform inverse DCT. The output from the inverse DCT section is added to the output from the motion compensation prediction section by the adding section, and then input to the frame memory. The output from the frame memory is input to the motion compensation prediction section. The motion compensation prediction section performs a front direction prediction, a rear direction prediction, and a bidirectional prediction, and outputs to the adding section and the subtracting section. These dequantization section, the inverse DCT section, the adding section, the frame memory, and the motion compensation prediction section constitute a local decoding section to restore a video signal identical to that of the video decoder.

The subtracting section performs a subtraction between the output from the picture sorting section and the output from the motion compensation prediction section to create a prediction error between the video signal and the decoded video signal decoded by the local decoding section. In a case of the intra-frame coding (I picture), with the switch, the subtracting section does not perform the subtraction processing, and data simply passes therethrough.

Returning to FIG. 1, the audio coder 12 is configured to comprise respective electronic circuits such as a subband coding section and an adaptive quantization bit allocating section, for example in the case of MPEG/Audio layer 1/layer 2. The audio signal is divided into subband signals of 32 bands by the subband coding section, quantized by the adaptive quantization bit allocating section in accordance with psychoacoustic weighting, and formed into a bit stream and then output.

To improve the coding quality, in a case of MPEG/Audio layer 3, an adaptive block length modified discrete cosine conversion section, an aliasing reduction butterfly, a nonlinear quantization section, and a variable coding section and the like are introduced.

The output from the video coder 11 and the output from the audio coder 12 are supplied to the file creator 15. The file creator 15 converts the data structures of the video elementary stream and the audio elementary stream to provide file structures which can be handled by computer software capable of reproducing moving pictures, sounds, texts and the like in synchronization without using a specific hardware configuration. As such software, QuickTime (hereinafter abbreviated as "QT") is known, for example. The following description is made for a case with the QT. The file creator 15 multiplexes the coded video data and the coded audio data. The file creator 15 is controlled by the system control microcomputer 19.

QuickTime movie files, which are the output from the file creator 15, are sequentially written to the memory 17 through the memory controller 18. The memory controller 18 reads the QuickTime movie files from the memory 17 when the system control microcomputer 19 requests writing of data to the recording medium 40. The system control microcomputer 19 also stores various data created during the execution of the program in the memory 17 through the memory controller 18.

The transfer rate of QuickTime movie coding is set to a lower transfer rate than the transfer rate of data written to the recording medium 40, for example, ½. Thus, while the QuickTime movie files are continuously written to the memory 17, reading of the QuickTime movie files from the memory 17 is performed intermittently under monitoring of the system control microcomputer 19 such that the memory 17 does not experience overflow or underflow.

The QuickTime movie file read from the memory 17 is supplied to the error correction coder/decoder 21 from the memory controller 18. The error correction coder/decoder 21 once writes this QuickTime movie file to the memory 20 and performs interleave and creation of redundant data of the error correction code. The error correction coder/decoder 21 reads the data with the redundant data added thereto from the memory 20 and supplies this to the data modulator/demodulator 23.

The data modulator/demodulator 23 modulates data such that clock extraction is facilitated upon reproduction and no problems occur such as intersymbol interference when digital data is recorded on the recording medium 40. For example, (1,7) RLL (Run Length Limited) codes, trellis codes and the like can be used.

The output from the data modulator/demodulator 23 is supplied to the magnetic field modulation driver 24 and the optical pickup 33. The magnetic field modulation driver 24 drives the magnetic head 32 in accordance with an input signal to apply a magnetic field to the recording medium 40. The optical pickup 33 irradiates the recording medium 40 with a laser beam for recording in accordance with the input signal. In this manner, the data is recorded on the recording medium 40.

The recording medium 40 is a disk-shape recording medium, and for example, a magneto-optical disk (MO), or a rewritable optical disk such as a phase change type disk.

An index file, later described, is preferably recorded in a substantially innermost portion of the disk-shape recording medium, for example, in a recording portion subsequent to a read-in of a CD (Compact Disc) in terms of readiness of reading.

In the present embodiment, an MO is used, for example, a relatively small-diameter disc having a diameter of approximately 4 cm, a diameter of approximately 5 cm, a diameter of approximately 6.5 cm, or a diameter of approximately 8 cm. The recording medium 40 is rotated by the motor 31 at a constant liner velocity (CLV), a constant angular velocity (CAV), or a zone constant linear velocity (ZCLV).

The drive control microcomputer 22 outputs a signal to the servo circuit 30 in response to a request of the system control microcomputer 19. The servo circuit 30 controls the motor 31 and the optical pickup 33 in accordance with this output to control the whole drive. For example, the servo circuit 30 performs movement servo in the diameter direction of the recording medium 40, tracking servo, and focus servo on the optical pickup 33, and controls the number of revolutions of the motor 31.

In addition, the manipulation section 26 for a user to enter a predetermined direction is connected to the system control microcomputer 19.

In reproduction, the optical pickup 33 irradiates the recording medium 40 with a laser beam with output for reproduction, and receives the reflecting light by an optical detector in the optical pickup 33 to obtain a reproduction signal. In such a case, the drive control microcomputer 22 detects a tracking error and a focus error from the output signal of the optical detector in the optical pickup 33 and controls the optical pickup 33 by the servo circuit 30 such that the reading laser beam is positioned on the track and focused on the track. The drive control microcomputer 22 also controls the movement of the optical pickup in the diameter direction to reproduce data at a desired position on the recording medium 40. The desired position is determined similarly to the recording time by the system control microcomputer 19 supplying a signal to the drive control microcomputer 22.

The reproduction signal of the optical pickup 33 is supplied to the data modulator/demodulator 23 and demodulated. The demodulated data is supplied to the error correction coder/decoder 21, and the reproduced data is once stored in the memory 20 for performing deinterleave and error correction. The QuickTime movie file after the error correction is stored in the memory 17 through the memory controller 18.

The QuickTime movie file stored in the memory 17 is output to the file decoder 16 in response to the request of the system control microcomputer 19. The system control microcomputer 19 monitors the data amount of the reproduced signal from the recording medium 40 stored in the memory 17 and the data amount read from the memory 17 and supplied to the file decoder 16 to control the memory controller 18 and the drive control microcomputer 22 such that the memory 17 does not experience overflow or underflow in order to continuously reproduce the video signal and the audio signal. In this manner, the system control microcomputer 19 intermittently reads data from the recording medium 40.

The file decoder 16 separates the QuickTime movie file into a video elementary stream and an audio elementary file under control of the system control microcomputer 19. The video elementary stream is supplied to the video decoder 13, subjected to decoding of compression and coding, and output from a video output terminal as a video output. The audio elementary stream is supplied to the audio decoder 14, subjected to decoding of compression and coding, and output from an audio output terminal as an audio output. Here, the file decoder 16 outputs the video elementary stream and the audio elementary stream in synchronization.

The video decoder 13 is configured to comprise respective electronic circuits of a buffer memory of a memory, a variable length code decoding section, a dequantization section, an inverse DCT section, an adding section, a frame memory, a motion compensation prediction section, a screen sorting section, and a digital/analog converter (hereinafter abbreviated as "D/A"), for example, in the case of MPEG. The video elementary stream is once stored in the buffer memory and input to the variable length decoding section. The variable length decoding section decodes macroblock coding information and separates a prediction mode, a motion vector, quantization information, and a quantization DCT coefficient. The quantization DCT coefficient is restored to a DCT coefficient by the dequantization section and converted into pixel spatial data by the inverse DCT section. The adding section adds the output from the dequantization section to the output from the motion compensation prediction section, but does not perform the addition when I pictures are decoded. All the macroblocks in the screen are decoded, and the screen is subjected to rearrangement to the original input order by the screen sorting section, and conversion is performed by the D/A to an analog signal which is output. In addition, the output from the adder is stored in the frame memory and output to the motion compensation prediction section since it is used as a reference screen in the later decoding in the case of I pictures and P pictures.

The audio decoder 14 is configured to comprise respective electronic circuits of a bit stream decomposition section, a dequantization section, and a subband synthesis filter bank section, for example in the case of MPEG/Audio layer 1/layer 2. The input audio elementary stream is divided into a header, auxiliary information, and a quantization subband signal by the bit stream decomposition section. The quantization subband signal is dequantized with bit numbers allocated by the dequantization section, synthesized by the subband synthesis filter bank, and then output.

Next, description is made for the camera-integral type digital recording/reproducing apparatus on which this recording/reproducing apparatus is mounted.

Figure 2A:
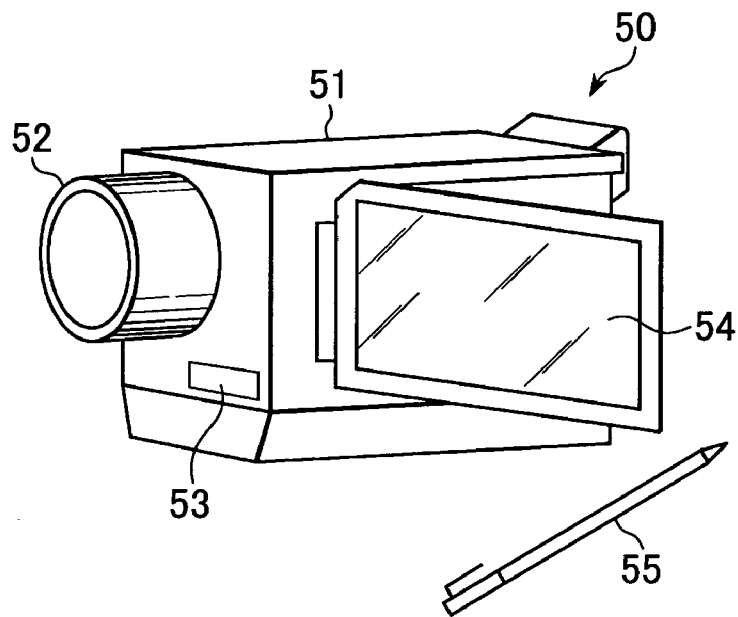
FIGS. 2A to 2B are schematic diagrams showing the outer appearance of a camera-integral type digital recording/reproducing apparatus.
Figure 2B:
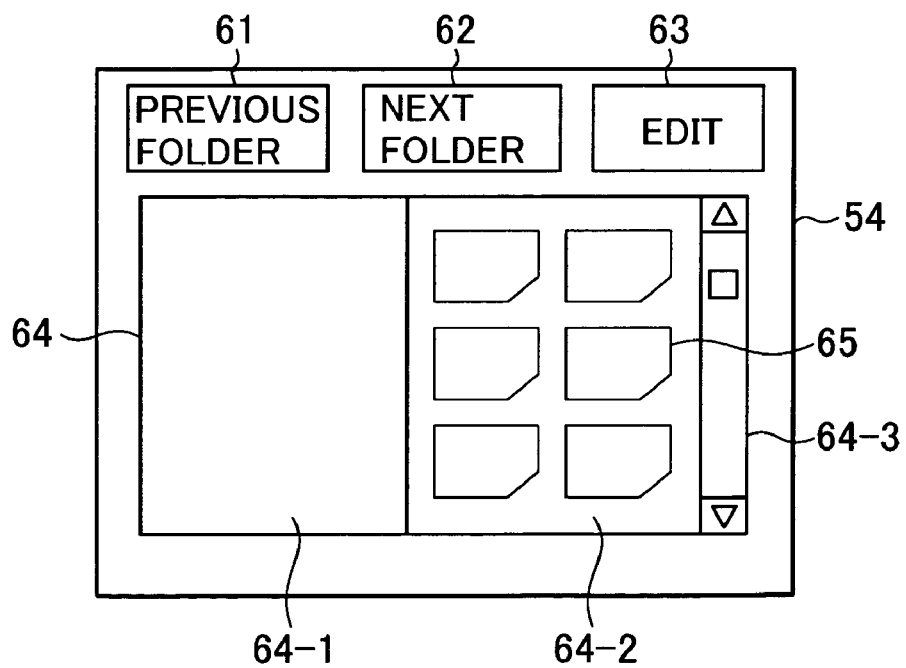

FIGS. 2A to 2B are schematic diagrams showing the outer appearance of the camera-integral type digital recording/reproducing apparatus. FIG. 2A is a general view of the camera-integral type digital recording/reproducing apparatus, and FIG. 2B is a schematic diagram showing an exemplary display with a display panel.

In FIG. 2A, a camera-integral type digital recording/reproducing apparatus 50 is configured to comprise a body 51, a lens section 52, a sound collecting microphone 53, and a display panel 54.

The digital recording/reproducing apparatus shown in FIG. 1 is housed in the body 51. A video signal is created by supplying imaging light of a subject to an image pickup device through an optical system of the lens section 52. An audio signal is created by the sound collecting microphone 53. The display panel 54 is configured to comprise a liquid crystal display and a piezoelectric element to perform display of a reproduced picture and corresponding to manipulation details. A user enters a desired manipulation by depressing the display panel 54 with a pointing device 55.

The display on the display panel 54 comprises "previous folder" 61, "next folder" 62, and "edit" 63 which are portions for the input of a desired manipulation and the display of manipulation details, and a main display area 64, for example as shown in FIG. 2B. The main display area 64 is configured to comprise a reproduction area 64-1 for displaying a reproduced picture, an index area 64-2 for displaying index data 65, and a scroll bar 64-3 for scrolling the index data.

Typically, the reproduced picture (moving picture or still picture) displayed in the reproduction area 64-1 is a file corresponding to the index data specified by depression with the pointing device 55 among a plurality pieces of index data (six pieces index data in FIG. 2B) displayed in the index area 64-2.

The index data is a disc title or extraction information of AV files, and the disc title is identification information for identifying a recording medium.

"Previous folder" 61 is depressed with the pointing device 55 or the like to change the display in the reproduction area 64-1 to the contents associated with the folder or the file specified immediately before the contents associated with the currently specified folder or file in the folder or file histories previously specified by the user.

"Next folder" 62 is depressed with the pointing device 55 or the like to change the display in the reproduction area 64-1 to the contents associated with the folder or the file specified immediately after the contents associated with the currently specified folder or file in the folder or file histories previously specified by the user.

"Edit" 63 is depressed with the pointing device 55 or the like to switch the main display area 64 to an edit screen.

In such a camera-integral type digital recording/reproducing apparatus 50, the disc title or the extraction information of files is created when the recording medium 40 is formatted or after the picture is taken, and is recorded as an index file on the recording medium 40. The index file manages the disc title or the file extraction information with a file system of a hierarchical structure. The index file according to the present invention is created for managing a plurality of files with the application stored on the recording medium aside from a file system for management information for managing a plurality of files with the OS (Operating System) recorded on the recording medium, for example, FAT (File Allocation Table) used in a flexible disk or hard disk and UDF (Universal Disk Format) used in CD-R/RW or DVD. In the present embodiment, the index file is created, for example in the form of the QuickTime movie file. The creation in the form of the QuickTime movie file allows a plurality of real data such as video data or audio data, the file extraction information, and the disc title to be recorded in the same form, and the recording/reproducing apparatus can reproduce all with the QT.

The QuickTime movie file is hereinafter described in general. QT is software which manages various data along the time basis, and is an OS expanded function for reproducing moving pictures, sounds, or texts in synchronization without using special hardware. The QT is disclosed, for example in "INSIDE MACINTOSH: QuickTime (Japanese version) (Addison-Wesley)."

A basic data unit in a QT movie resource is called an atom. Each atom includes size and type information together with its data. In addition, in the QT, the minimum unit of data is handled as a sample, and a chunk is defined as a set of samples.

Figure 3:
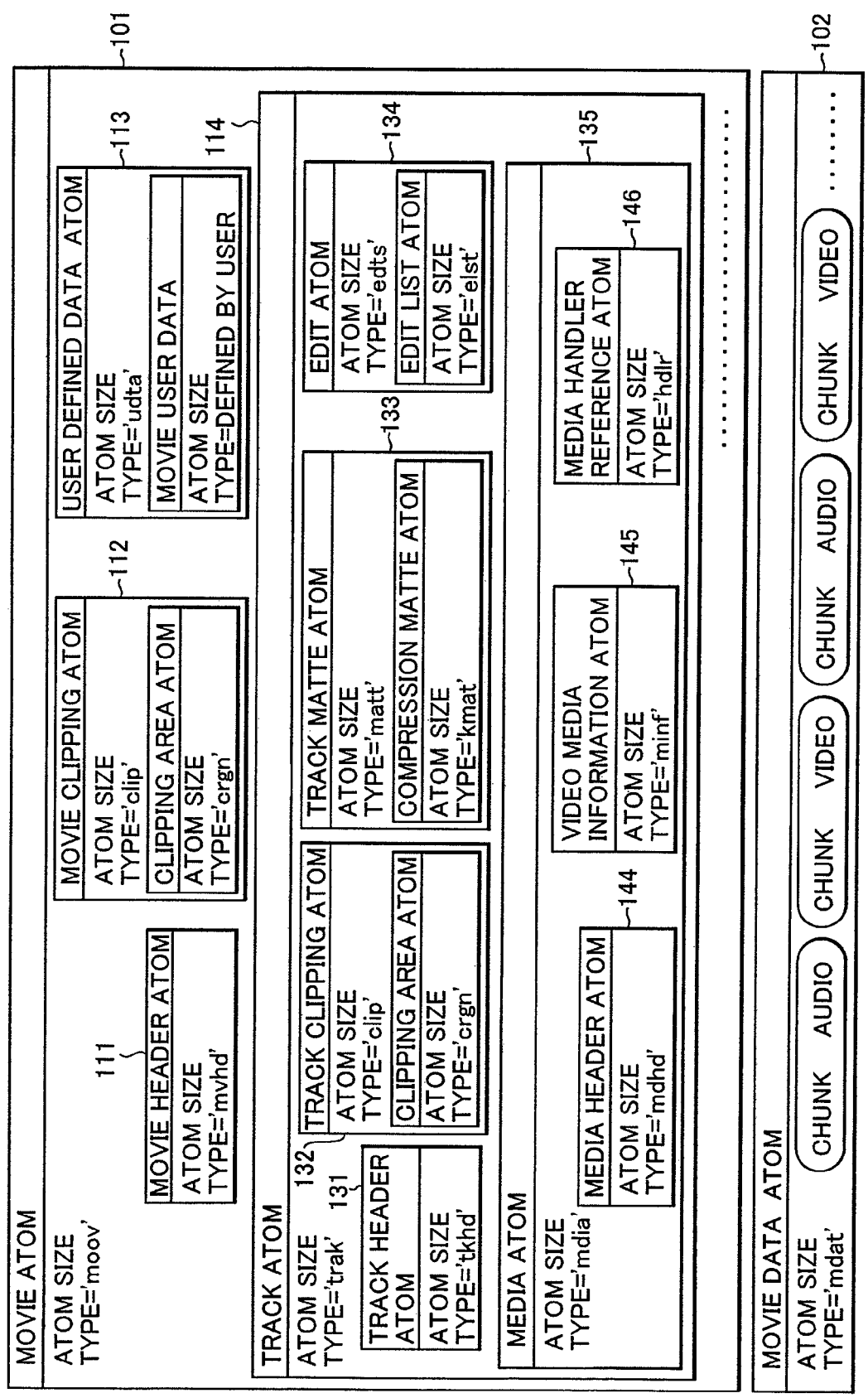
FIG. 3 is a diagram showing an exemplary configuration of a QuickTime movie file.

FIG. 3 is a diagram showing an exemplary configuration of the QuickTime movie file.

Figure 4:
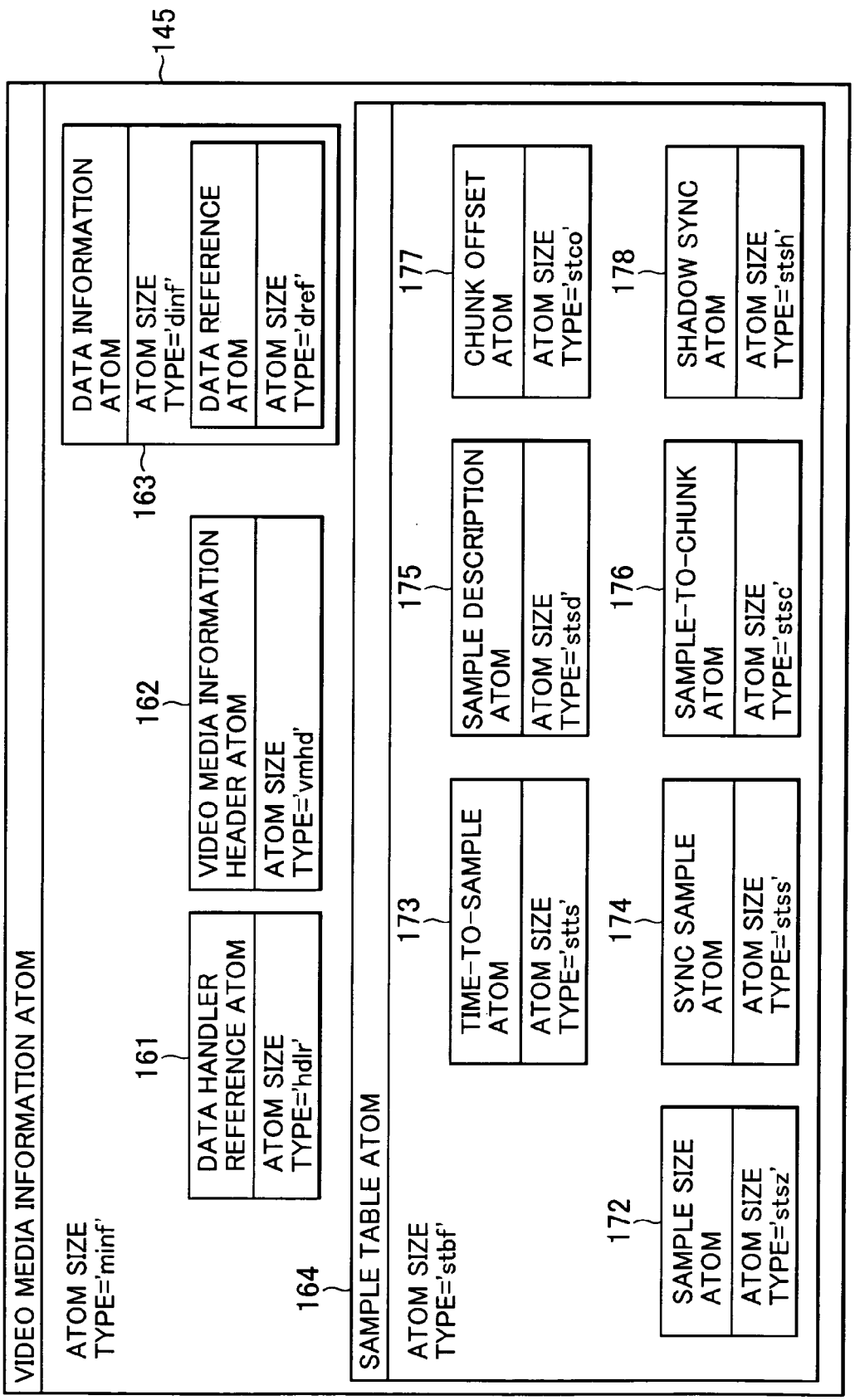
FIG. 4 is a diagram showing an exemplary configuration of a video media information atom.

FIG. 4 is a diagram showing an exemplary configuration of a video media information atom. FIG. 4 is a diagram showing the video media information atom in FIG. 3 in more detail to show a case where a track is video information.

In FIGS. 3 and 4, the QuickTime movie file is mainly comprised of two parts, a movie atom 101 and a movie data atom 102. The movie atom 101 is a part for storing information required for reproducing the file and information required for referring to real data. The movie data atom 102 is a part for storing the real data such as video data or audio data.

The movie atom 101 includes a movie header atom 111 for holding information on the whole movie, a movie clipping atom 112 for specifying a clipping area, a user defined data atom 113, and one or a plurality of track atoms 114, and the like.

The track atom 114 is prepared for each track in the movie. In the track atom 114, information on individual data of the movie data atom 102 is described in a track header atom 131, a track clipping atom 132, a track matte atom 133, an edit atom 134, and a media atom 135. In FIG. 3, a track atom 114-1 of one vide movie is shown, and other track atoms are omitted.

In the media atom 135, information for defining a component for interpreting movie track data or media data or the like is described in a media header atom 144, a media information atom (a video media information atom 145 in FIGS. 3 and 4), and a media handler reference atom 146.

The media handler uses information of the media information atom to perform mapping from a media time to media data.

The media information atom 145 includes a data handler reference atom 161, a media information header atom 162, a data information atom 163, and a sample table atom 164.

In the media information header atom (a video media information header atom 162 in FIG. 4), information on media is described. In the data handler reference atom 161, information on handling of media data is described, which includes information for specifying a data handler component for providing an access means to the media data. The data information atom 163 includes a data reference atom, in which information on data is described.

The sample table atom 164 includes information required for converting a media time into a sample number which specifies a sample position. The sample table atom 164 may comprise a sample size atom 172, a time-to-sample atom 173, a sync sample atom 174, a sample description atom 175, a sample-to-chunk atom 176, a chunk offset atom 177, and a shadow sync atom 178.

In the sample size atom 172, the sample size is described. In the time-to-sample atom 173, the association between the sample and the time base of how many seconds of data is recorded is described. In the sync sample atom 174, information on synchronization is described, and a key frame in the media is specified. The key frame is a self-inclusive type frame independent of the preceding frame. The sample description atom 175 stores information required for decoding the sample in the media. The media can have one or a plurality of sample description atoms depending on the kind of a compression type used in that media. The sample chunk atom 176 refers to a table in the sample description atom 175 to identify a sample description corresponding to each sample in the media. In the sample chunk atom 176, the association between the sample and the chunk is described, and a sample position in the media is identified on the basis of information on the first chunk, the number of samples per chunk, and the sample description-ID. In the chunk offset atom 177, the start bit position of a chunk in the movie data is described, and the position of each chunk in the data stream is defined.

In FIG. 3, the movie data atom 102 stores, for example, audio data coded in the predetermined compression and coding scheme and picture data coded in the predetermined compression and coding scheme in the unit of chunks comprised of a predetermined number of samples. It should be noted that data is not necessarily subjected to the compression and coding, and linear data can be stored. For example, when text data, MIDI or the like is handled, the movie data atom 102 includes a large amount of real data such as text or MIDI, and accordingly, the movie atom 101 includes text tracks, MIDI tracks or the like.

Each track in the movie atom 101 corresponds to data stored in the movie data atom 102.

In such a hierarchical structure, when data in the movie data atom 102 is reproduced, the QT sequentially follows the hierarchy from the movie atom 101, develops the sample table in the memory in accordance with the respective atoms 172 to 178 in the sample table atom 164 to identify the association between the respective data. Then, the QT reproduces the data in accordance with the association between the respective data.

Since the QT has such a data structure, the index file of the present embodiment holds the real data of the disk title and the real data of the file extraction information in the movie data atom, and holds management information on these real data in the movie atom. In addition, these real data are managed in a hierarchical tree structure formed with a plurality of folders (directories). The movie data atom of the index file is hereinafter referred to as an index data atom, and the movie atom is referred to as an index atom.

Here, the index file depends on data handled by files recorded on the recording medium, and in the present embodiment, it is assumed that data of files is picture data and audio data. In addition, such a file is hereinafter abbreviated as "AV file."

When the AV file is recorded on the recording medium in this manner, the index file holds four kinds of data of property, text, thumbnail picture, and intro, for example. The property is data showing the disc title and the attribute of each AV file. Thus, in the index file, only the property holding the attribute information is an essential file. The present invention has one characteristic that the property is divided into a fixed data length portion and a variable length portion which are held in the movie data atom (index data atom 202), later described.

The text data is data showing character strings of a disc title and a title associated with each AV file, and has a data length set to a fixed length.

The thumbnail picture data is one representative picture data of a disc title and each AV file, and has a data length set to a fixed length. The thumbnail picture of the disc title can be arbitrarily provided by the user, and for example, may be automatically set such that picture data held in a first entry area of the index file is thumbnail picture data. The thumbnail picture of an AV file can be arbitrarily provided by the user, and for example, may be automatically set to the first picture data in that AV file.

The intro data is representative audio data for a short time of the disc title and each AV file, and has a data length set to a fixed length. The intro of the disc title can be arbitrarily provided by the user, and for example, may be automatically set to the intro data held in a first entry area of the index file. The intro of an AV file can also be arbitrarily provided by the user, and for example, may be automatically set to first several seconds in that AV file, for example, audio data of five seconds.

The area for holding these text, thumbnail picture, and intro are prepared in the index file as required in consideration of convenience of search. In addition, while the data of the property must be registered, all the data of the text, the thumbnail picture, and the intro are not necessarily registered even when the respective areas for holding the text, the thumbnail picture, and the intro data are ensured.

Figure 5:
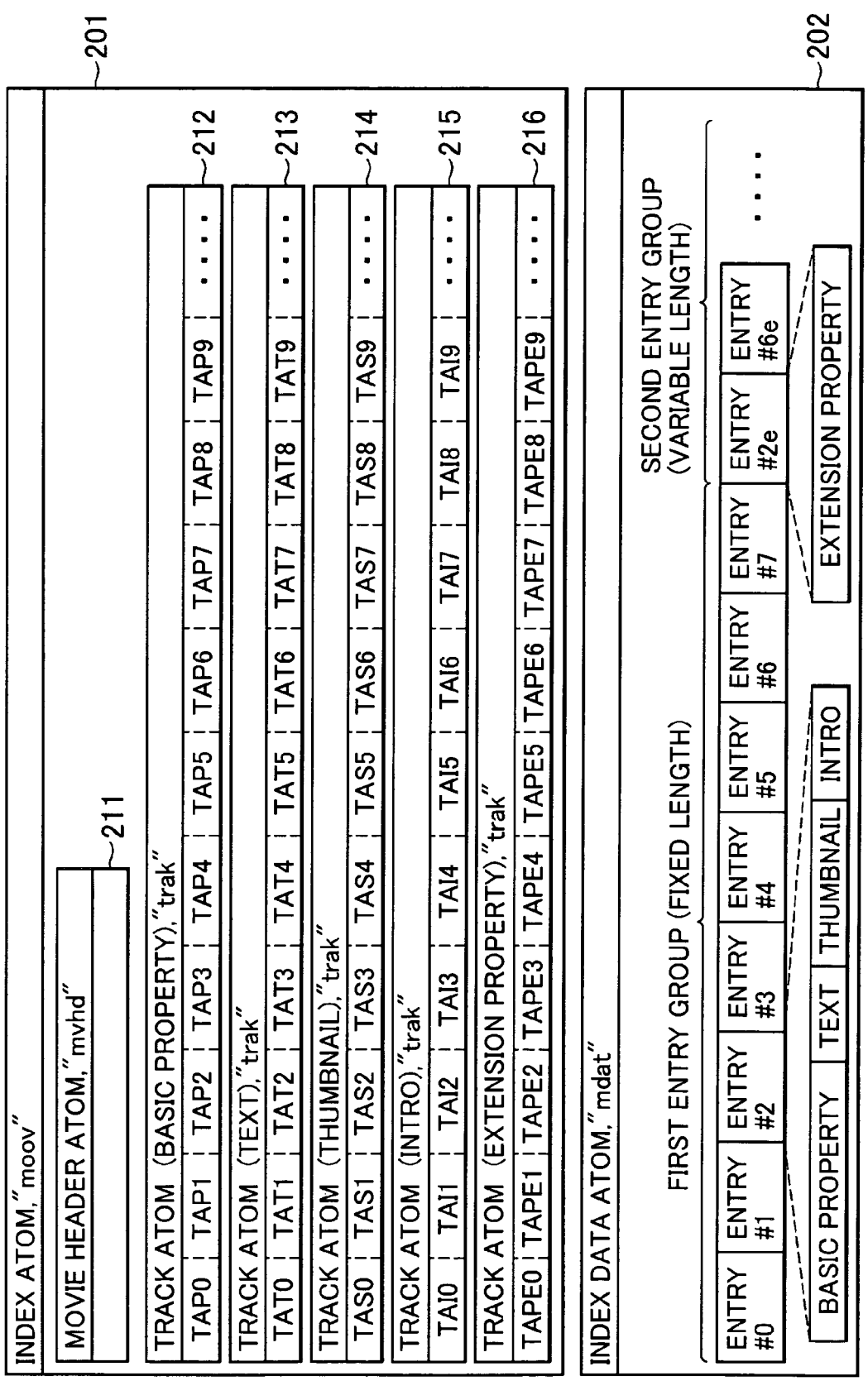
FIG. 5 is a diagram showing an example of an index file in a first embodiment formed by using the QuickTime movie file.

FIG. 5 is a diagram showing an example of the index file in the first embodiment formed by using the QuickTime movie file.

In FIG. 5, the index file is configured to comprise an index atom 201 and an index data atom 202.

The index data atom 202 holds real data on basic properties, texts, thumbnail pictures, intros, and extension properties. The real data on the basic property, the text, the thumbnail picture, the intro, and the extension property associated with the disc title are held in an entry #0 which is the first area of the index data atom 202. Real data on the basic property, the text, the thumbnail picture, the intro, and the extension property associated with respective AV files are held in an entry #1 to an entry #n (n is an integer equal to or larger than one) which are respective areas of the second area and thereafter in the index data atom 202.

The property for holding the attribute information is comprised of a basic property which is a collection of fields having a data length of a fixed length and an extension property which is a collection of fields having a data length of a variable length. Thus, the data length of the basic property is a fixed length, and the data length of the extension property is a variable length.

The index atom 201 is configured to comprise a track atom (basic property) 212, a track atom (text) 213, a track atom (thumbnail picture) 214, a track atom (intro) 215, and a track atom (extension property) 216 corresponding to the real data of the basic property, the text, the thumbnail picture, the intro, and the extension property, respectively, and a movie header atom 211. A flag of the sample description atom is used for allowing the determination whether the track atom handles the fixed length data or the variable length data. For example, when the flag of the sample description atom is 1, the track atom includes fixed length data. When the flag of the sample description atom is two, the track atom includes variable length data. Thus, by referring to the flag of the sample description atom, it is possible to easily identify the track atom (basic property) 212 or the track atom (extension property) 216. In addition, to achieve compatibility with the prior art in which the property is not divided, a case where a track atom holds both fixed length data and variable length data is defined, and a case where the flag of the sample description atom is three applies to such a case.

It should be noted that, as described above, only the track atom (property) 212 and the real data of the property are essential.

In the index data atom 202, each position for storing the basic property, the text, the thumbnail, the intro, and the extension property of each entry is shown by each sample table atom in the track atom (basic property) 212, the track atom (text) 213, the track atom (thumbnail) 214, the track atom (intro) 215, and the track atom (extension property) 216. For example, in the entry of the entry number 0, the position of the basic property is shown by the first TAP0 in a table obtained by the sample table atom in the track atom (basic property) 212. The position of the text is shown by the first TAT0 in the table obtained by the sample table atom in the track atom (text) 213. The position of the thumbnail is shown by the first TAS0 in the table obtained by the sample table atom in the track atom (thumbnail) 214. The position of the intro is shown by the first TAI0 in the table obtained by the sample table atom in the track atom (intro) 215. The position of the extension property is shown by the first TAPE0 in the table obtained by the sample table atom in the track atom (extension property) 216. In the present embodiment shown in FIG. 5, no extension property is attached to the entry of the entry number 0, no information indicating a position is stored in TAPE0, and a dummy substantially indicating no position is stored. In addition, for example, in the entry of the entry number 2, the position of the basic property is shown by the third TAP2 in the table obtained by the sample table atom in the track atom (basic property) 212. The position of the text is shown by the third TAT2 in the table obtained by the sample table atom in the track atom (text) 213. The position of the thumbnail is shown by the third TAS2 in the table obtained by the sample table atom in the track atom (thumbnail) 214. The position of the intro is shown by the third TAI2 in the table obtained by the sample table atom in the track atom (intro) 215. The position of the extension property is shown by the third TAPE 2 in the table obtained by the sample table atom in the track atom (extension property) 216.

A first entry group which is a collection of entries holding the respective real data of the basic property, the text, the thumbnail, and the intro has a fixed length, and a second entry group which is a collection of entries holding the real data of the extension property has a variable length. For example, in FIG. 5, the portions of the entry number 0 (entry #0), the entry number 1 (entry #1), the entry number 2 (entry #2), the entry number 3 (entry #3), the entry number 4 (entry #4), the entry number 5 (entry #5), the entry number 6 (entry #6), and the entry number 7 (entry #7) are the first entry group of the fixed length, and the subsequent portions of the entry number 2e (entry #2e), the entry number 6e (entry #6e), . . . are the second entry group of the variable length.

FIG. 6 is a diagram showing an example of the track atom (basic property).

In FIG. 6, the track atom (basic property) 212 is in the form of a table showing data lengths L_PR1, L_PR2, L_PR3, . . . , L_PRn, and start byte positions 0, L_PR1, L_PR1+L_PR2, . . . , L_PR1+ . . . +L_PRn−1, for an AV file basic property #0, an AV file basic property #1, an AV file basic property #2, . . . , an AV file basic property #n, defined as a chunk associated with the basic property data corresponding to the disc title and each AV file. The data length is, for example, a variable length displayed in the unit of bytes.

FIG. 7A and FIG. 7B are diagrams showing exemplary real data of the property in the first embodiment.

FIG. 7A shows the basic property which is a collection of respective fields having a data length of a fixed length in the real data of the property, and FIG. 7B shows the extension property which is a collection of respective fields having a data length of a variable data in the real data of the property. While FIG. 7B shows a case where there is one field having a data length of a variable length, a plurality of such fields may exist. In addition, while the extension property may include a field having a data length of a fixed length, it includes at least a field having a data length of a variable length.

The property is comprised of the fixed length basic property and the variable length extension property, as described above. By dividing the property into the fixed length portion and the variable length portion in this manner, it is possible to reduce a rewriting time in editing or the like.

In FIG. 7A, the real data of the basic property is configured to comprise an entry number, an entry property, a folder property, a version, a flag, a data type, a creation time, a modification time, and a duration. Each data length is a fixed length. In FIG. 7B, the extension property is configured to comprise a file identifier, and has a variable data length.

The entry number is a number starting with 0, and is the only number assigned uniquely to each entry, that is, an identifier for specifying the entry. The entry number shows in which entry the real data of that property is held. The entry number is four-byte data with the 0th byte serving as a start byte position. Since it is necessary only that the entry number specifies that an entry is which entry in the index data atom, it is not limited to a number and may be a symbol or a sign such as an alphabet.

The entry property is data of one byte with the fourth byte serving as a start byte position, and is given a specific meaning for each bit. In the present embodiment, the 0th bit of 8 bits is used to indicate whether the data associated with that entry is a folder or real data. When the 0th bit is 0, it indicates a folder, and when the 0th bit is 1, it indicates data. The first bit of the 8 bits indicates whether or not an extension property is attached to the basic property associated with that entry. When the first bit is 0, it indicates no extension property attached, and when the first bit is 1, it indicates an extension property attached. The second bit to the seventh bit have predetermined meanings defined. Alternatively, they are undefined as reserved bits.

The folder property is the entry number of the folder to which that entry belongs. Here, when that entry holds information of the disc title, this entry is considered as a "root" which is a folder at the highest level in the hierarchy, and a predetermined identifier is assigned to indicate this. As the identifier indicating this root, for example, the entry number 0 itself for holding the disc title is assigned, a special identifier (for example, "T," "D," "M," or the like) is assigned, or the largest number of the entry numbers is assigned since it is contemplated that the largest number of the entry numbers of four bytes is hardly used. In the present embodiment, "T" is assigned. Alternatively, it is previously defined that no folder property of the disc title exists, and the program is formed such that the folder property is not referred to when the entry is the disc title. The folder property is data of four bytes with the fifth byte serving as a start byte position. The folder refers to an arrangement for organizing a plurality of files, and a folder may have not only files but also another folder registered therein.

The version is data of one byte with the ninth byte serving as a start byte position. The flag is data of two bytes with the tenth byte serving as a start byte position. The data type indicates a data type (moving picture, still picture, audio or the like) in the title file or the AV file associated with that property, and is data of one byte with the twelfth byte serving as a start byte position. The creation time indicates the date and time at which the AV file associated with that property is created, and is data of four bytes with the thirteenth byte serving as a start byte position. The modification time indicates the date and time at which the AV file associated with that property is modified, and is data of four bytes with the seventeenth byte serving as a start byte position. The duration indicates the length of time required for reproducing the AV file associated with that property, and is data of four bytes with the twenty-first byte serving as a start byte position.

The file identifier indicates the file name of the AV file associated with that property, and is data of a variable length with the 0th byte serving as a start byte position.

The index file manages the index data in a hierarchical structure with the above-mentioned entry number, the entry property, and the folder property.

Next, a specific example is described for the association among the entry number, the entry property, the folder property, and the hierarchical structure of the index data.

FIG. 8A to FIG. 8B are diagrams showing an example of the property information and the structure of the index data in the first embodiment. FIG. 8A shows the entry number, the 0th bit and the first bit of the entry property, and the folder property. FIG. 8B is a diagram showing the structure of the index data.

In FIG. 8A to FIG. 8B, the entry number 0 indicates the folder since the 0th bit of the entry property is 0, and no extension property is attached since the first bit of the entry property is 0, and it is the disc title root since the folder property is T.

The entry number 1 indicates index data since the 0th bit of the entry property is 1, no extension property is attached since the first bit of the entry property is 0, and the entry of the entry number 1 belongs to the entry number 0, that is, the root since the folder property is 0.

The entry number 2 indicates index data since the 0th bit of the entry property is 1, an extension property is attached since the first bit of the entry property is 1, and the entry of the entry number 2 belongs to the entry number 0, that is, the root since the folder property is 0.

Here, the extension property of the entry number 2 has the position and the size of the data described in the third TAPE2 from the beginning since the entry number is 2. By referring to this, it is possible to know where the data of the extension property is stored in the index data atom.

The entry number 3 indicates the folder since the 0th bit of the entry property is 0, no extension property is attached since the first bit of the entry property is 0, and the entry of the entry number 3 belongs to the entry number 0, that is, the root since the folder property is 0.

From the foregoing, the root holds the entry of the entry number 1, the entry of the entry number 2, and the entry of the entry number 3.

The entry number 4 indicates the folder since the 0th bit of the entry property is 0, no extension property is attached since the first bit of the entry property is 0, and the entry of the entry number 4 belongs to the folder of the entry number 3 since the folder property is 3.

The entry number 5 indicates index data since the 0th bit of the entry property is 1, no extension property is attached since the first bit of the entry property is 0, and the entry of the entry number 5 belongs to the folder of the entry number 3 since the folder property is 3.

The entry number 6 indicates index data since the 0th bit of the entry property is 1, an extension property is attached since the first bit of the entry property is 1, and the entry of the entry number 6 belongs to the folder of the entry number 4 since the folder property is 4.

Here, the extension property of the entry number 6 has the position and the size of the data described in the seventh TAPE6 from the beginning since the entry number is 6. By referring to this, it is possible to know where the data of the extension property is stored in the index data atom.

The entry number 7 indicates index data since the 0th bit of the entry property is 1, no extension property is attached since the first bit of the entry property is 0, and the entry of the entry number 7 belongs to the folder of the entry number 4 since the folder property is 4.

It can be seen that the structure of the index data is the hierarchical structure shown in FIG. 8B from the entry number, the 0th bit of the entry property, and the folder property. From the first bit of the entry property, as shown in FIG. 5, it can be seen that extension properties are attached to the basic property of the entry number 2 and the basic property of the entry number 6, respectively. On the other hand, the positions of these extension properties held in the index data atom 202 can be known by referring to the track atom (extension property) 216, as described above.

The use of the first bit of the entry property allows division of the property into the basic property which is a fixed length portion and the extension property which is a variable length portion and allows identification of whether or not an extension property is attached to the basic property.

Thus, as shown in FIG. 5, when the real data of the basic property, the text, the thumbnail, the intro, and the extension property are held in the respective entries of the index data atom 202, it is possible to collectively hold the entries holding the real data of the basic property, the text, the thumbnail, and the intro with the data length of a fixed length in the index data atom 202 as the first entry group, and subsequently, it is possible to collectively hold the entries holding the real data of the extension property with the data length of a variable length as the second entry group.

Thus, even when the contents of the file identifier are rewritten due to edits or the like to result in the data length larger than that before the rewriting, it is necessary only that the rewritten entry of the second entry set and subsequent portions are again written and the track atom (extension property) is rewritten.

Since the data length of the second entry set is only part of the data of the property as shown in FIG. 7A to FIG. 7B, it is extremely less than the first entry set, and the rewriting time can be significantly shorter than a case where the present invention is not applied.

It should be noted that, even when the entry property, the folder property, the modification date and time in the basic property, or the text, the thumbnail, and the intro are rewritten, the data length of the first entry group is constant since these data lengths are set to fixed lengths.

In addition, while the property is divided into the basic property and the extension property to perform division into the first entry group of the fixed length and the second entry group of the variable length, as shown in FIG. 9, the basic property and the extension property may be held in one entry as conventional.

Second Embodiment

In the first embodiment, the property can be divided into the fixed length portion and the variable length portion by handling the extension property as another track and using the track atom (extension property) and the first bit of the entry property. In the second embodiment, the property can be divided into the fixed length portion and the variable length portion by using one bit of the entry property and the folder property.

Since a recoding/reproducing apparatus and a camera-integral type digital recording/reproducing apparatus in the second embodiment are similar to the recording/reproducing apparatus and the camera-integral type digital recording/reproducing apparatus shown in FIG. 1 and FIG. 2A to FIG. 2B, respectively, description thereof is omitted.

Figure 10:
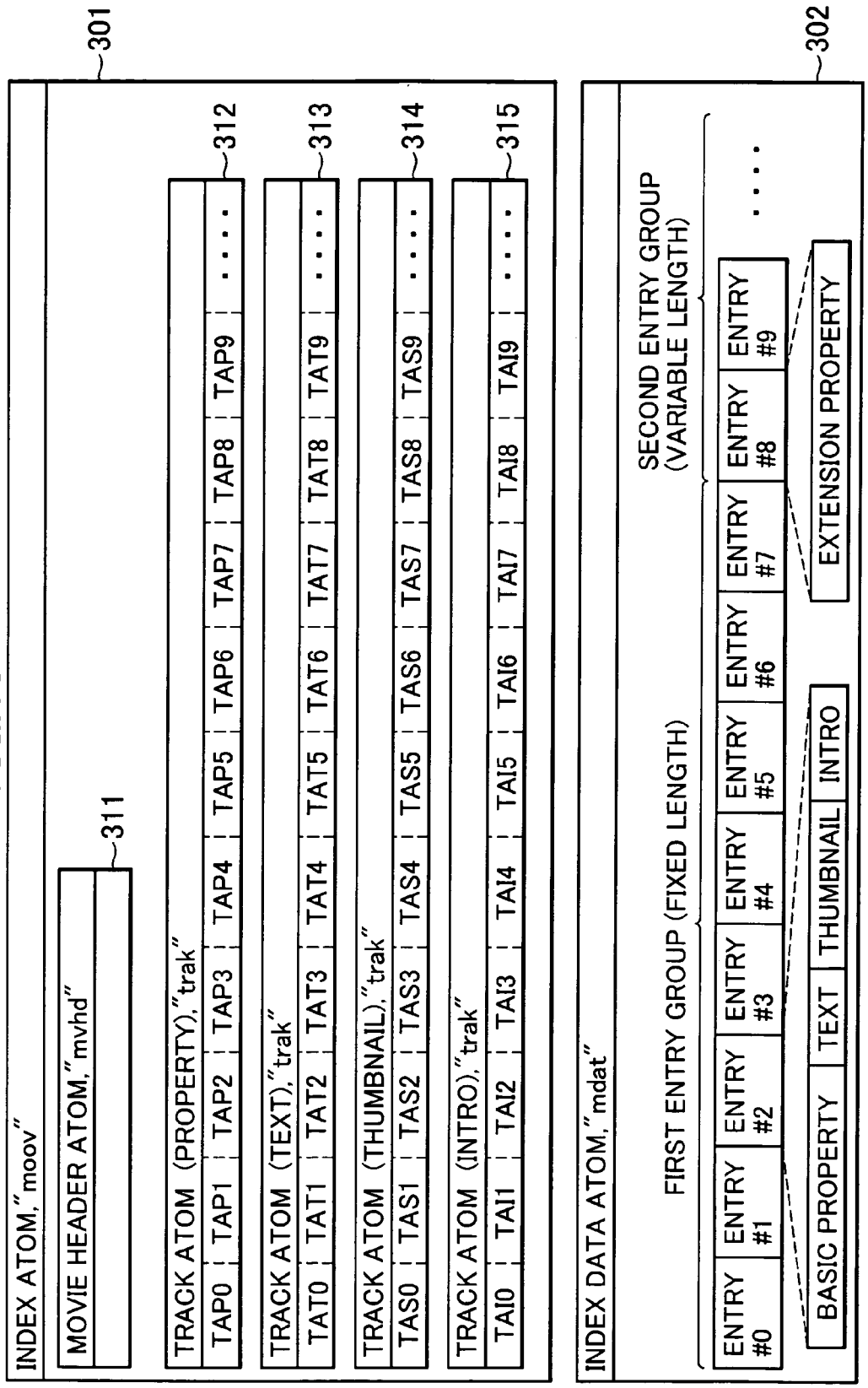
FIG. 10 is a diagram showing an exemplary index file in a second embodiment created by using the QuickTime movie file.

FIG. 10 is a diagram showing an exemplary index file in the second embodiment created by using the QuickTime movie file.

In FIG. 10, the index file is configured to comprise an index atom 301 and an index data atom 302.

The index data atom 302 holds real data of basic properties, texts, thumbnail pictures, intros, and extension properties. The property is held separately as the basic property of a fixed length portion and the extension property of a variable length portion.

The index atom 301 is configured to comprise a track atom (property) 312, a track atom (text) 313, a track atom (thumbnail picture) 314, and a track atom (intro) 315 corresponding to the real data of the property, the text, the thumbnail picture, and the intro, and a movie header atom 311.

In the index data atom 302, each position for storing the basic property, the text, the thumbnail, the intro, and the extension property of each entry is shown by each sample table atom in the track atom (property) 312, the track atom (text) 313, the track atom (thumbnail) 314, and the track atom (intro) 315.

A first entry group which is a collection of entries holding the respective real data of the basic property, the text, the thumbnail, and the intro has a fixed length, and a second entry group which is a collection of entries holding the real data of the extension property has a variable length. For example, in FIG. 10, the portions of the entry number 0 (entry #0), the entry number 1 (entry #1), the entry number 2 (entry #2), the entry number 3 (entry #3), the entry number 4 (entry #4), the entry number 5 (entry #5), the entry number 6 (entry #6), and the entry number 7 (entry #7) are the first entry group of the fixed length, and the subsequent portions of the entry number 8 (entry #8), the entry number 9 (entry #9), . . . are the second entry group of the variable length.

FIG. 11A to FIG. 11B are diagrams showing exemplary real data of the property in the second embodiment.

FIG. 11A shows the basic property which is a collection of respective fields with the data length of a fixed length in the real data of the property. FIG. 11B shows the extension property which is a collection of respective fields with the data length of a variable length in the real data of the property. FIG. 11B shows a case where one field has a data length of a variable data, but a plurality of fields may exist.

In FIG. 11A, the real data of the basic property is configured to comprise an entry number, an entry property, a folder property, a version, a flag, a data type, a creation time, a modification time, and a duration. Each data length is a fixed length. In FIG. 11B, the extension property is configured to comprise an entry number, an entry property, a folder property, and a file identifier. The file identifier is variable length data.

Since the entry number, the folder property, the version, the flag, the data type, the creation time, the modification time, and the duration are similar to those in the first embodiment, respectively, description thereof is omitted.

The entry property is data of one byte with the fourth byte serving as a start byte position, and is given a specific meaning for each bit. In the present embodiment, the 0th bit of 8 bits is used to indicate whether the data associated with that entry is a folder or real data, similarly to the first embodiment. When the 0th bit is 0, it indicates a folder, and when the 0th bit is 1, it indicates data. The second bit of the 8 bits indicates whether or not that entry holds the real data of the extension property. When the second bit is 0, it indicates it is not the real data of the extension property, and when the second bit is 1, it indicates the real data of the extension property. The residual respective bits have predetermined meanings defined. Alternatively, they are undefined as reserved bits.

The folder property is the entry number of the folder or data to which that entry belongs.

The index file manages the index data in the hierarchical structure with the above-mentioned entry number, the entry property, and the folder property.

Next, a specific example is described for the association among the entry number, the entry property, the folder property, and the hierarchical structure of the index data.

FIG. 12A to FIG. 12B are diagrams showing an example of the property information and the structure of the index data in the second embodiment. FIG. 12A shows the entry number, the 0th bit and the second bit of the entry property, and the folder property. FIG. 12B is a diagram showing the structure of the index data.

In FIG. 12A to FIG. 12B, the entry number 0 indicates the folder since the 0th bit of the entry property is 0, and no real data of the extension property is held since the second bit of the entry property is 0, and it is the disc title root since the folder property is T.

The entry number 1 indicates index data since the 0th bit of the entry property is 1, no real data of the extension property is held since the second bit of the entry property is 0, and the entry of the entry number 1 belongs to the entry number 0, that is, the root since the folder property is 0.

The entry number 2 indicates index data since the 0th bit of the entry property is 1, no real data of the extension property is held since the second bit of the entry property is 0, and the entry of the entry number 2 belongs to the entry number 0, that is, the root since the folder property is 0.

The entry number 3 indicates the folder since the 0th bit of the entry property is 0, no real data of the extension property is held since the second bit of the entry property is 0, and the entry of the entry number 3 belongs to the entry number 0, that is, the root since the folder property is 0.

The entry number 4 indicates the folder since the 0th bit of the entry property is 0, no real data of the extension property is held since the second bit of the entry property is 0, and the entry of the entry number 4 belongs to the entry number 3 since the folder property is 3.

The entry number 5 indicates index data since the 0th bit of the entry property is 1, no real data of the extension property is held since the second bit of the entry property is 0, and the entry of the entry number 5 belongs to the entry number 3 since the folder property is 3.

The entry number 6 indicates index data since the 0th bit of the entry property is 1, no real data of the extension property is held since the second bit of the entry property is 0, and the entry of the entry number 6 belongs to the entry number 4 since the folder property is 4.

The entry number 7 indicates index data since the 0th bit of the entry property is 1, no real data of the extension property is held since the second bit of the entry property is 0, and the entry of the entry number 7 belongs to the entry number 4 since the folder property is 4.

The entry number 8 indicates index data since the 0th bit of the entry property is 1, real data of the extension property is held since the second bit of the entry property is 1, and the entry of the entry number 7 belongs to the entry number 2 since the folder property is 2.

The entry number 9 indicates index data since the 0th bit of the entry property is 1, real data of the extension property is held since the second bit of the entry property is 1, and the entry of the entry number 9 belongs to the entry number 6 since the folder property is 6.

It can be seen that the structure of the index data is the hierarchical structure shown in FIG. 12B from the entry number, the 0th bit and the second bit of the entry property, and the folder property. From the second bit of the entry property, as shown in FIG. 10, it can be seen that the real data of the extension property is held in the entry of the entry number 8 and the entry of the entry number 9, respectively. In addition, from these folder properties, it can be seen that it belongs to the basic property in which entry.

Specifically, the extension property held in the entry of the entry number 8 serves as a property in combination with the basic property held in the entry of the entry number 2 since the folder property is 2. The extension property held in the entry of the entry number 9 serves as a property in combination with the basic property held in the entry of the entry number 6 since the folder property is 6.

The use of the second bit of the entry property allows division of the property into the basic property which is a fixed length portion and the extension property which is a variable length portion. The use of the folder property can indicate to which basic property the extension property is attached. Thus, as shown in FIG. 10, when the real data of the basic property, the text, the thumbnail, the intro, and the extension property are held in the respective entries of the index data atom 302, it is possible to collectively hold the entries holding the real data of the basic property, the text, the thumbnail, and the intro with the data length of a fixed length in the index data atom 302 as the first entry group, and subsequently, it is possible to collectively hold the entries holding the real data of the extension property with the data length of a variable length as the second entry group.

Thus, even when the contents of the file identifier are rewritten due to edits or the like to result in the data length larger than that before the rewriting, it is necessary only that the rewritten entry of the second entry group and subsequent portions are again written and the track atom (property) is rewritten.

Since the data length of the second entry group is only part of the data of the property as shown in FIG. 7A to FIG. 7B, it is extremely less than the first entry group, and the rewriting time can be significantly shorter than a case where the present invention is not applied.

It should be noted that, even when the entry property, the folder property, the modification date and time in the basic property, or the text, the thumbnail, and the intro are rewritten, the data length of the first entry group is constant since these data lengths are set to fixed lengths.

The recording apparatus, the recording method, the recording medium, and the electronic camera according to the present invention can hold the attribute information associated with a plurality of recorded files in the index file separately as the portion with the data length of a fixed length and the portion with the data length of a variable length. Thus, even if the data length of the whole attribute information is varied when the contents of the index file are changed due to edits or the like of the file recorded on the recording medium, the varied portion is created only in the variable portion, so that the variable portion may be again recorded on the recording medium.

Therefore, the re-recording can be performed faster than the case where the whole index file is re-recorded on the recording medium.

What is claimed is:

1. A recording apparatus comprising:
   creating means for creating an index file for a file, the index file indicating attribute information of the file and including a plurality of areas to each of which a unique identifier is assigned; and
   recording means for recording said index file on a recording medium,
      wherein said creating means divides the attribute information indicated by the index file into first attribute information which is a collection of fields with a data length of a fixed length and second attribute information including a field with a data length of a variable length;
      said creating means stores separately a plurality pieces of first attribute information associated with a plurality of files recorded on said recording medium, respectively, and a plurality pieces of second attribute information associated with said plurality pieces of first attribute information, respectively, in said plurality of areas while said plurality pieces of first attribute information are associated with said plurality of files, respectively, and said plurality pieces of second attribute information are associated with said plurality pieces of first attribute information, respectively;
      said creating means collects an area of said plurality of areas with a data length of a fixed length as a first area group, and collects an area of said plurality of areas with a data length of a variable length as a second area group that are stored in an index file.

2. The recording apparatus according to claim 1, wherein said index file comprises:
   a first portion storing said first area group and said second area group; and
   a second portion storing information indicating respective positions of said plurality of areas in said first portion,
   wherein said first attribute information is associated with said second attribute information by having identification information indicating whether or not said second attribute information is attached to said first attribute information included as a field in said first attribute information.

3. The recording apparatus according to claim 1, wherein said second attribute information includes identification information indicating that the identification is attribute information attached to the first attribute information in a field, and
   said first attribute information is associated with said second attribute information by having identification information indicating said first attribute information to which said second attribute information is attached included in said second attribute information.

4. The recording apparatus according to claim 1, wherein said creating means further stores a plurality pieces of extraction information corresponding to said plurality of files, respectively, in areas in which the first attribute information of the corresponding files are held.

5. The recording apparatus according to claim 4, wherein each of said plurality pieces of extraction information is picture data associated with each of said plurality of files.

6. The recording apparatus according to claim 4, wherein each of said plurality pieces of extraction information is audio data associated with each of said plurality of files.

7. The recording apparatus according to claim 4, wherein each of said plurality pieces of extraction information is text data associated with each of said plurality of files.

8. A recording method, comprising:
   a creating step executed by a file creator for creating an index file for a file, the index file indicating attribute information of the file and including a plurality of areas to each of which a unique identifier is assigned;
   a dividing step of dividing the attribute information indicated by the index file into first attribute information which is a collection of fields with a data length of a fixed length and second attribute information including a field with a data length of a variable length;
   a storing step of storing separately a plurality pieces of first attribute information associated with a plurality of files recorded on a recording medium, respectively, and a plurality pieces of second attribute information associated with said plurality pieces of first attribute information, respectively, in a plurality of areas to each of which a unique identifier is assigned while said plurality pieces of first attribute information are associated with said plurality of files, respectively, and said plurality pieces of second attribute information are associated with said plurality pieces of first attribute information, respectively;

a collecting step of collecting an area of said plurality of areas with a data length of a fixed length as a first area group;

a collecting step of collecting an area of said plurality of areas with a data length of a variable length as a second area group; and a recording step of recording the created index file on the recording medium.

9. A computer-readable medium for storing a program for recording an index file created by a recording method, said method comprising:

a creating step of creating an index file for a file, the index file indicating attribute information of the file and including a plurality of areas to each of which a unique identifier is assigned;

a dividing step of dividing the attribute information indicated by the index file into first attribute information which is a collection of fields with a data length of a fixed length and second attribute information including a field with a data length of a variable length;

a storing step of storing separately a plurality pieces of first attribute information associated with a plurality of recorded files, respectively, and a plurality pieces of second attribute information associated with said plurality pieces of first attribute information, respectively, in a plurality of areas to each of which a unique identifier is assigned while said plurality pieces of first attribute information are associated with said plurality of files, respectively, and said plurality pieces of second attribute information are associated with said plurality pieces of first attribute information, respectively;

a collecting step of collecting an area of said plurality of areas with a data length of a fixed length as a first area group; and a collecting step of collecting an area of said plurality of areas with a data length of a variable length as a second area group.

10. An electronic camera comprising:

creating means for creating an index file for a file, the index file indicating attribute information of the file and including a plurality of areas to each of which a unique identifier is assigned; and recording means for recording a picture signal obtained by taking a picture of a subject as a file on a recording medium and recording said index file on the recording medium, wherein said creating means divides the attribute information indicated by the index file into first attribute information which is a collection of fields with a data length of a fixed length and second attribute information including a field with a data length of a variable length;

said creating means stores separately a plurality pieces of first attribute information associated with a plurality of files recorded on said recording medium, respectively, and a plurality pieces of second attribute information associated with said plurality of first attribute information, respectively, in said plurality of areas while said plurality pieces of first attribute information are associated with said plurality of files, respectively, and said plurality pieces of second attribute information are associated with said plurality pieces of first attribute information, respectively;

said creating means collects an area of said plurality of areas with a data length of a fixed length as a first area group, and collects an area of said plurality of areas with a data length of a variable length as a second area group.

* * * * *

UNITED STATES PATENT AND TRADEMARK OFFICE
CERTIFICATE OF CORRECTION

| | |
|---|---|
| PATENT NO. | : 7,609,296 B2 |
| APPLICATION NO. | : 10/398618 |
| DATED | : October 27, 2009 |
| INVENTOR(S) | : Hirabayashi et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this

Twelfth Day of October, 2010

David J. Kappos
*Director of the United States Patent and Trademark Office*